United States Patent [19]

Burks, Jr.

[11] 4,195,291

[45] Mar. 25, 1980

[54] DIGITAL CONTROLLED ROTATION SENSOR

[75] Inventor: Kenneth N. Burks, Jr., Little Rock, Ark.

[73] Assignee: Ward Industries, Inc., Jackson, Mich.

[21] Appl. No.: 898,707

[22] Filed: Apr. 24, 1978

[51] Int. Cl.² .............................................. G08B 21/00
[52] U.S. Cl. ................................... 340/671; 324/175;
340/600
[58] Field of Search ........................ 340/671, 600, 672;
324/161, 175, 166

[56] References Cited

U.S. PATENT DOCUMENTS

| 3,559,065 | 1/1971 | Grundy | 340/671 |
| 3,739,276 | 6/1973 | Dornberger | 324/161 |
| 3,866,120 | 2/1975 | Ford | 340/175 |

OTHER PUBLICATIONS

Goodwin, John K. "Digital Tachometer Aids in Turbine Design," *Electronics* Apr. 10, 1959, pp. 58–61.

*Primary Examiner*—Glen R. Swann, III
*Attorney, Agent, or Firm*—Beaman & Beaman

[57] ABSTRACT

An electronic sensor for detecting motion and the rate of motion, particularly rotative movement, utilizes digital control apparatus wherein pulses are transmitted to a digital counter at a rate proportional to the rate of rotation of the member being sensed, and the pulses are compared with a time reference signal to produce a control sequence for comparing the pulses to predetermined set point values wherein an alarm or control signal is produced if the rate of rotation of the member sensed deviates between predetermined set points. The pulses being sensed are produced by an infrared light passing through a light shutter mounted upon the rotating member being sensed wherein the rate of pulsation of the light passing through the shutter is directly related to the rate of shutter rotation, and the pulses are sensed by electronic means producing a control signal.

2 Claims, 9 Drawing Figures

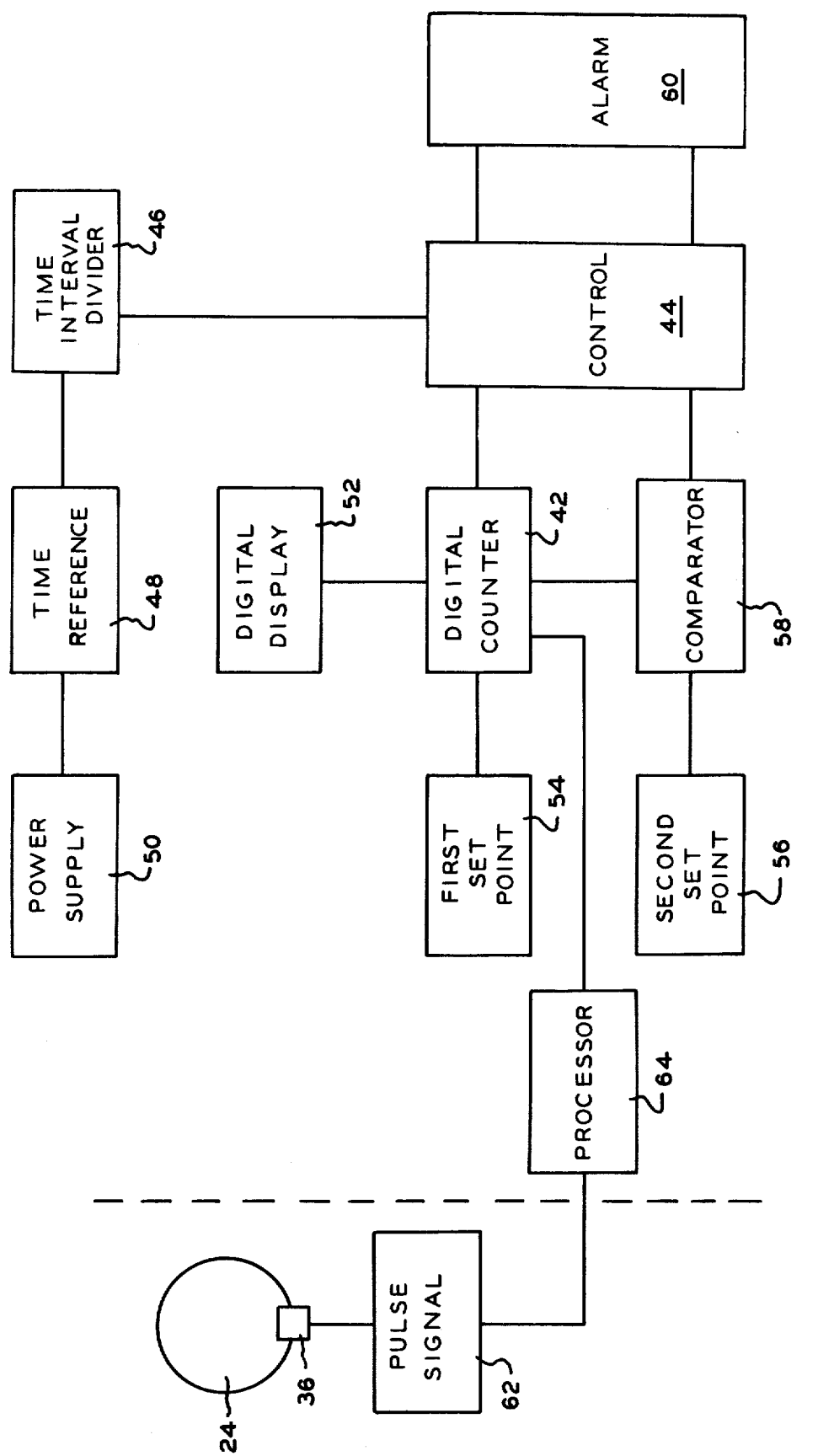

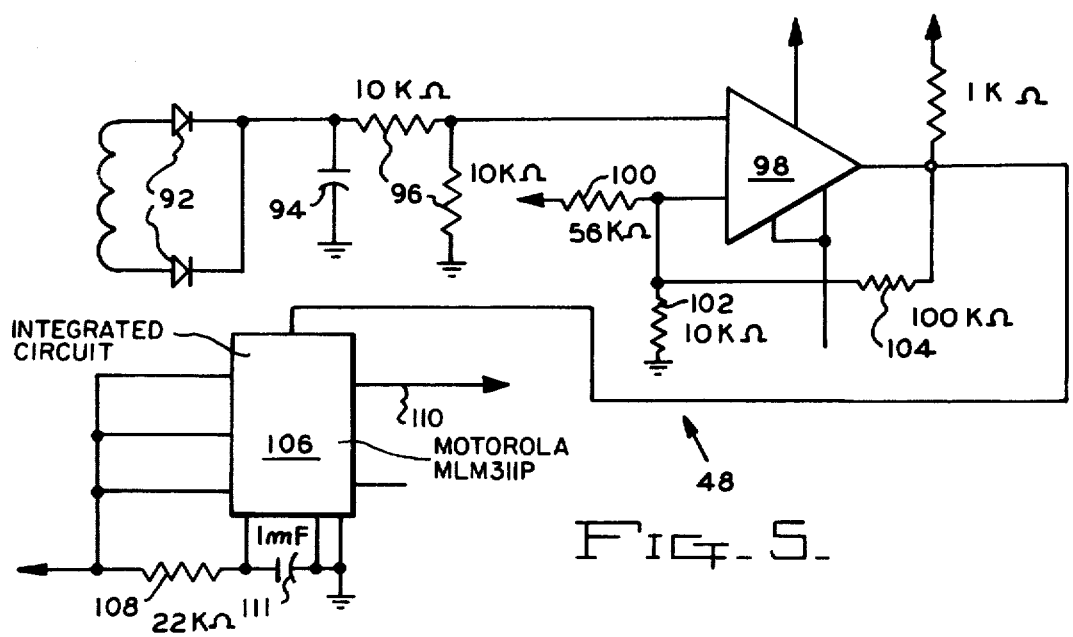
FIG_5_
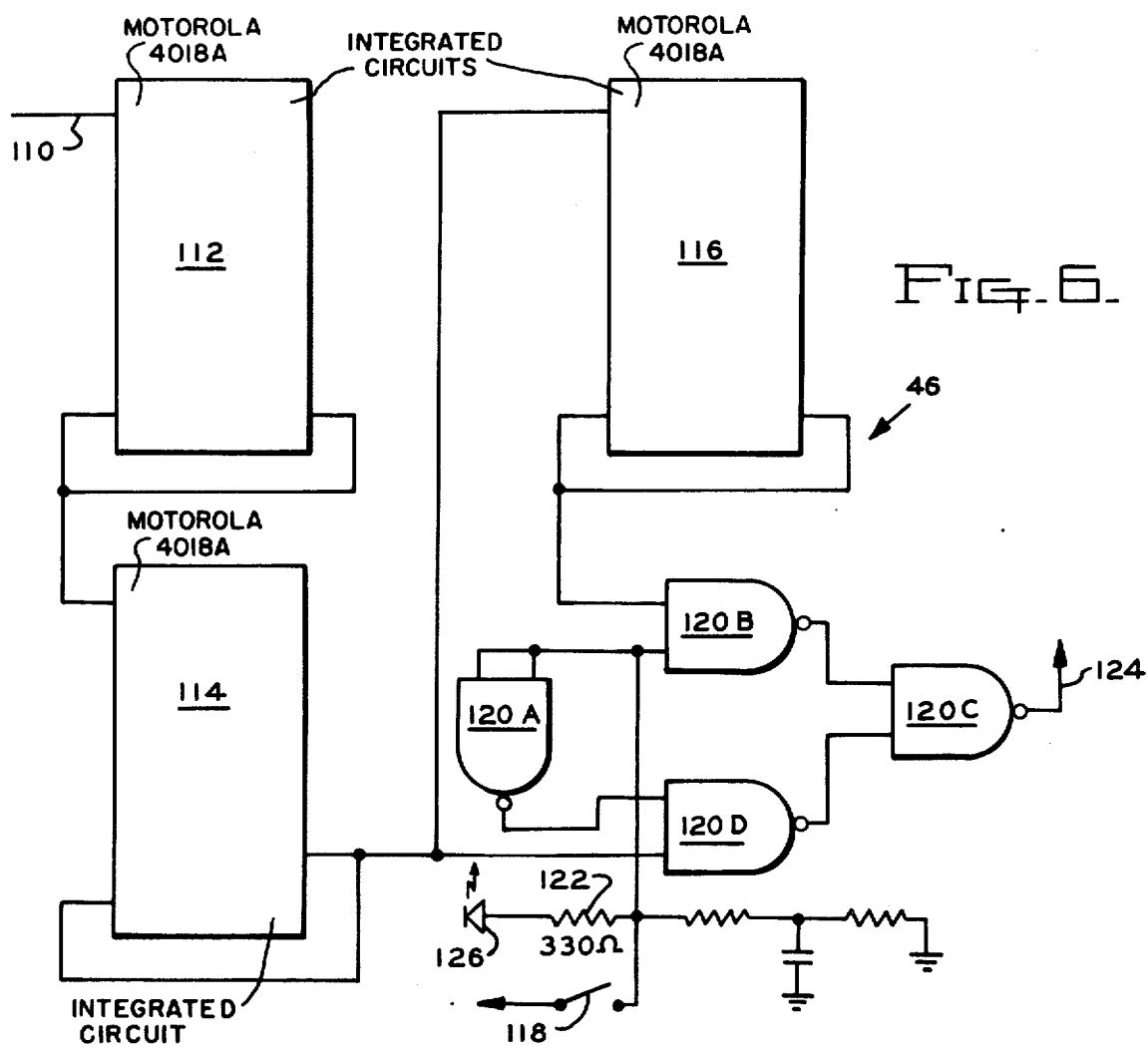
FIG_6_

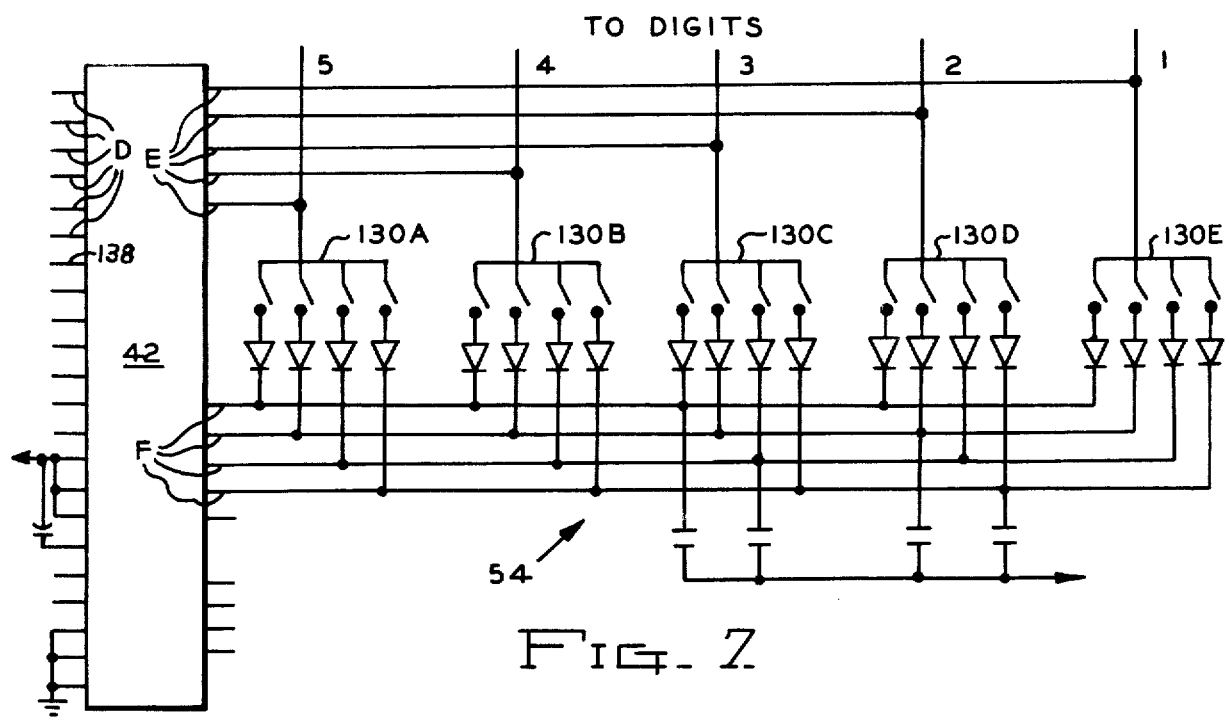
FIG_7
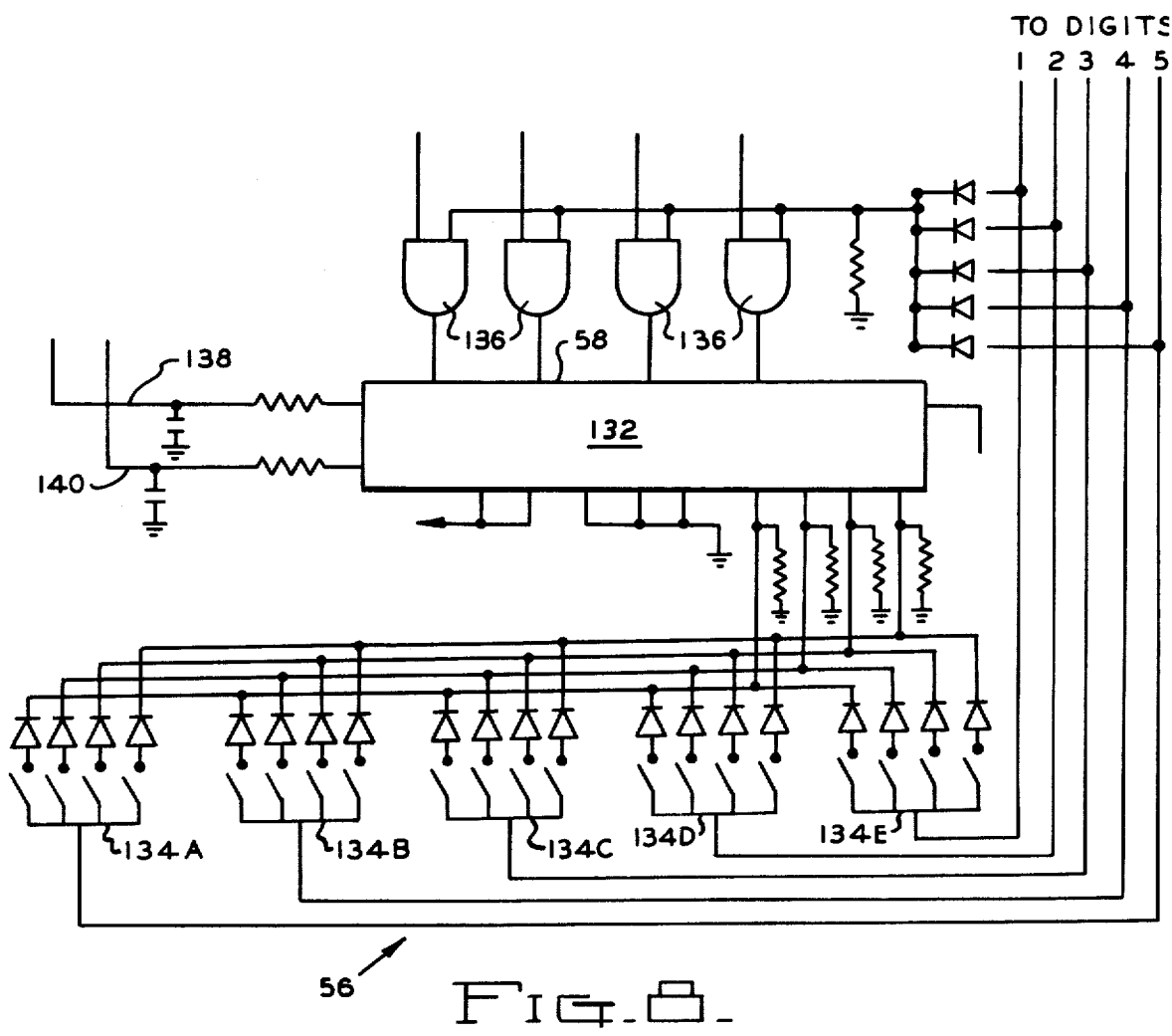
FIG_8

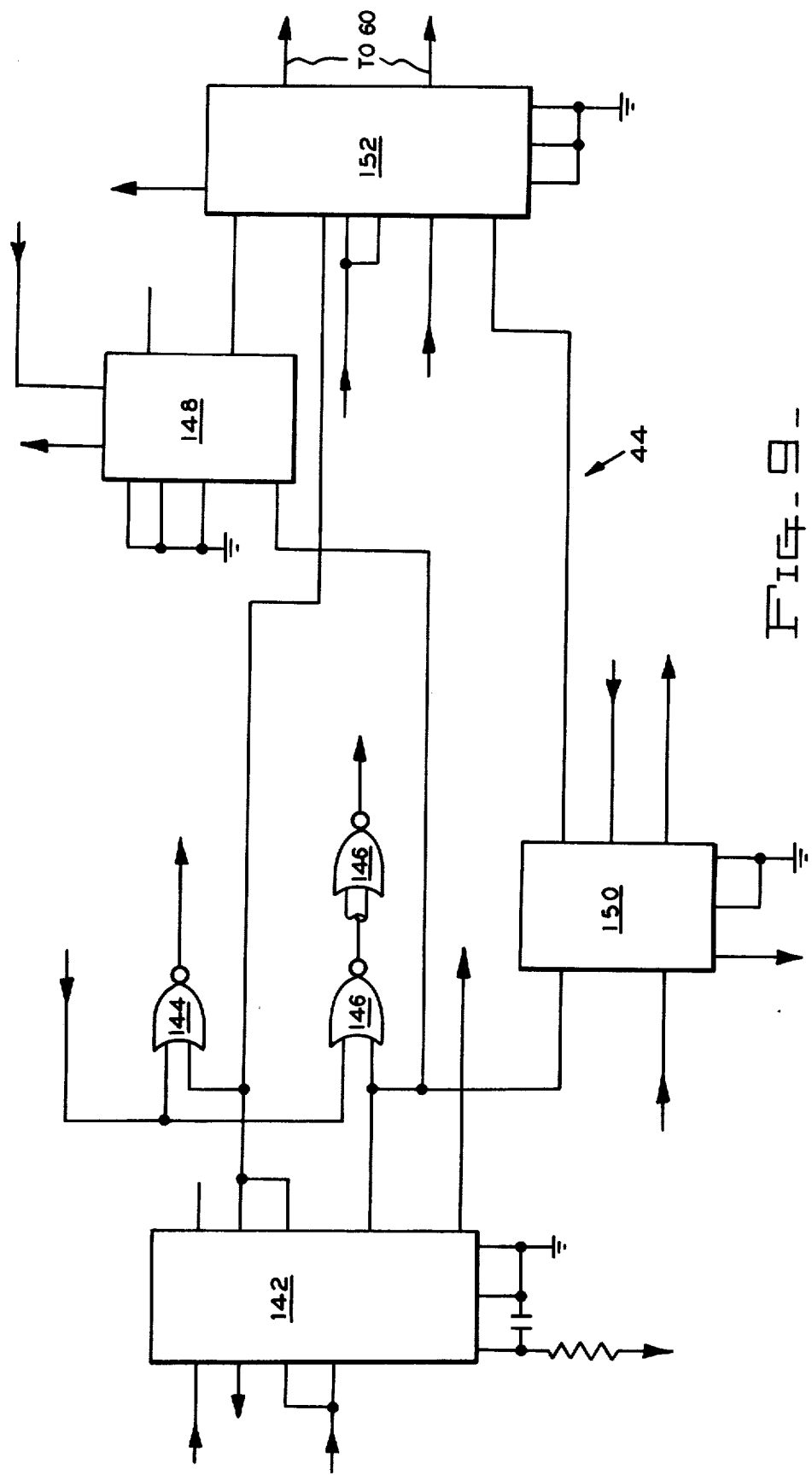

DIGITAL CONTROLLED ROTATION SENSOR

BACKGROUND OF THE INVENTION

The invention pertains to rotational motion sensors utilizing digital counters and set points that may be digitally indicated.

In the electric motor control art installations utilizing electric motors often have need of a monitoring system for sensing the rate of motion of the apparatus being driven by the motor. For instance, in the material handling art, wherein bulk materials are transported by feed screws, conveyor belts, bucket chains or similar conveying apparatus, it is common to use monitoring devices which indicate that the conveyor is overloaded and is operating at a speed below that for which it was designed. Similar requirements to detect the rate of operation of electric motor driven apparatus exists in the air handling arts, assembly lines, machine control art, food processing plants, and the like.

It is known to monitor the operation of electric motor driven apparatus by sensing devices, and it is also known to monitor the characteristics of electric motors under load by sensing the current or voltage consumption. However, known mechanical and electrical motor sensing controls often are not sensitive enough to malfunctioning and speed variations to provide the degree of precise control desired in low tolerance situations, for instance wherein a deviation of two or three revolutions per second is critical. Also, many known rotation monitoring devices do not react with sufficient speed to prevent damage to the motor under instantaneous stall out and overload conditions.

Rotational motion sensors of an electronic nature are available which are capable of reacting to slow-down, overload and motor stalling conditions, and such rotational sensing circuits usually employ switching means in the form of transistors, and capacitors, in conjunction with control signal pulse producing means driven by the element to be sensed wherein a voltage is permitted to build up at a rate proportional to the duration of the control pulse and is discharged intermediate control pulses. Deviations between the time interval of control pulses beyond the predetermined tolerances of the control circuit will produce a voltage energizing an alarm or control signal. Apparatus of this nature is shown in the assignee's U.S. Pat. No. 3,845,375.

However, electronic rotational sensing apparatus presently available, such as disclosed in assignee's prior mentioned patent, cannot readily be adjusted to operate within very close tolerances, nor can such apparatus be preset to produce an alarm or control signal at two set points wherein alarm signals are produced at two values of deviation from the norm.

SUMMARY OF THE INVENTION

It is an object of the invention to provide a rotational motion sensor of the digital type wherein the limits of deviation from a preset rotation may be digitally introduced into a control circuit, a direct reading digital readout of the rate of rotation of the element to be sensed is provided, and a digital comparison is made between the rate of rotation of the element being sensed and the desired rotative speed.

A further object of the invention is to provide a rotational motion sensor of the electronic digital type wherein pulses produced at a rate proportional to the rate of rotation of the member being sensed produce an electronic signal actuating a digital counter, the counter receiving a time reference signal to relate pulses to time, and the counter further being related to preset alarm limits wherein a predetermined deviation between the desired rotational speed and alarm limits produces an alarm signal.

Another object of the invention is to provide an electronic digital rotation sensor utilizing a rotating shutter mounted upon the element whose relative motion is to be sensed, the shutter consisting of alternating opaque and transparent areas through which infrared light may be alternately pass to produce a signal by light sensing means. The pulsating signal produced by the shutter rotation is fed into a digital counter having a time reference, the counter having a plurality of adjustable alarm or set points whereby an alarm or control signal is produced upon a predetermined variation occurring from the preset rotative speed.

One of the significant advantages of the invention lies in the fact that the rotational sensor in accord with the invention utilizes low voltages and amperage wherein the apparatus is intrinsically safe with respect to being explosion proof as the circuitry is not capable of producing a sufficient spark to ignite an explosive atmosphere.

In the practice of the invention the apparatus to be controlled by the sensor is mechanically connected to a rotatable shaft wherein the shaft will rotate at a rate directly related to the rate of rotation of the device sensed. Sensing apparatus is utilized to detect the rate of rotation of the shaft wherein electronic pulses or signals are created at a rate directly proportional to the rate of shaft rotation.

Preferably, the electronic pulses are generated by infrared light sensing means controlled by a shutter mounted upon the shaft and rotating therewith. However, the signals could be generated by other shutter means, or could be produced by contact switches, magnetic switches or similar devices mechanically connected to the rotating shaft.

The electronic pulsating signals are transmitted to a digital counter which is connected to a digital display. A time reference signal, which has been divided, and may be selectively adjusted to produce a 0.4 second cycle, or a 4 second cycle, is supplied to the digital counter whereby the pulse count is related to time to produce a digital display readout in relation to time, for instance, revolutions per second.

The apparatus of the invention produces electric alarm or control signals upon the rate of rotation of the member being sensed deviating from a preselected setting. Accordingly, a set of binary coded decimal switches are connected to the digital counter introducing an adjustable preset condition into the counter whereby, upon such condition occurring, an alarm or control signal is produced.

Further, it is also desired that a second alarm or control signal be generated upon a second predetermined value or setting occurring within the digital counter, and for such purpose a second set of binary coded decimal switches are connected to the digital counter through a comparator whereby a second alarm or control signal will be generated upon the second set point occuring. For instance, the first set point may be preadjusted to energize a warning light upon the rate of shaft rotation slightly decreasing from the preselected rate of operation. Upon the shaft slowing down sufficiently to trip the second set point the alarm signal generated may be employed to automatically stop the electric motor powering the apparatus whose rotation is being sensed.

Integrated circuits are utilized in the practice of the invention, and the electronic control provided is capable of accurately sensing and producing alarm or control signals upon the rate of rotation of the shaft being sensed varying one or two revolutions per second. The digital counting and time referencing of the pulses generated by the rotating shaft produces a more dependable circuit than prior art devices wherein control voltages alternately build up and are discharged, and the versatility, ease of read out, and accuracy of the sensor in accord with the invention constitutes a significant advance over the known art.

In the preferred embodiment, the rotating shaft whose rotation is sensed supports a shutter disc having alternating light transmitting and light impervious sections whereby a light source positioned on one side of the disc will pass therethrough at a rate directly proportional to the rate of shaft and shutter rotation, and light sensing means located on the other side of the disc will create an electronic pulse in accordance with the reception of light at a rate directly proportional to the shaft rotation. Preferably, infrared light is utilized in producing the pulse signal as infrared light is less affected by dirt, dust, moisture and other foreign matter which may form on the shutter than is visible light.

BRIEF DESCRIPTION OF THE DRAWINGS

The aforementioned objects and advantages of the invention will be appreciated from the following description and accompanying drawings wherein:

FIG. 3 is a schematic block diagram of the circuit components utilized in the practice of the invention, FIG. 5 is a circuit diagram of the time reference signal producing circuit, FIG. 6 is a block diagram illustrating the time divider circuit, FIG. 7 is a schematic diagram of the digital counter and first set point switch circuit, FIG. 8 is a schematic circuit diagram of the comparator and second set point switch circuit, FIG. 9 is a schematic view of the control circuit connected to the digital counter, comparator and alarm relay circuitry.

DESCRIPTION OF THE PREFERRED EMBODIMENT

Figure 1:
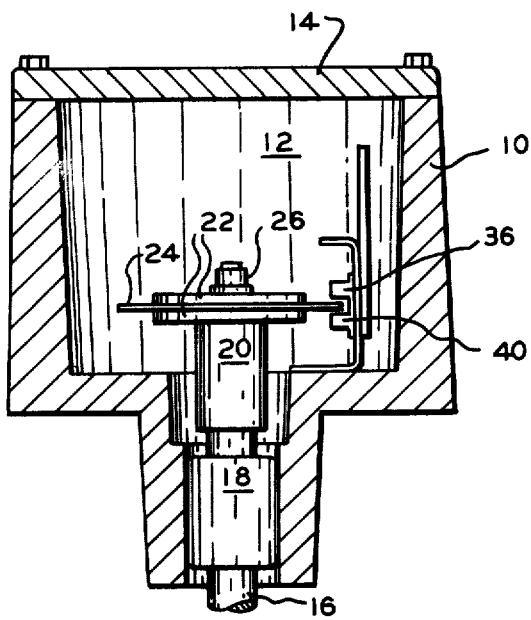
FIG. 1 is a diametrical sectional, elevational, view of the rotating shaft housing and shutter apparatus.
Figure 2:
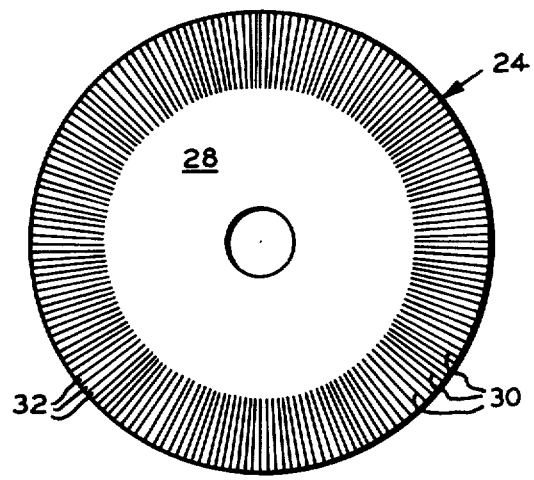
FIG. 2 is a plan elevational view of a shutter, per se, constructed in accord with the invention.

The mechanical apparatus employed by a sensor in accord with the invention is best appreciated from FIGS. 1 and 2. In FIG. 1, a housing 10 is illustrated which encloses the apparatus for producing the pulsating signal controlling the sensor circuit. The housing defines a chamber 12, enclosed by cover 14 adapted to be bolted thereon, and a shaft 16, rotatively supported upon bearing 18 mounted on the housing 10, includes an inner end collar 20 extending into the chamber 12. The shaft 16 is mechanically connected to the conveyor, table, shaft, fan, motor, or the like whose operation, as represented by the rate of rotation of the shaft 16, is to be monitored. The apparatus being monitored is not illustrated, and it is within the scope of those skilled in the art to provide the mechanical means for connecting shaft 16 to such apparatus, not shown.

The inner end collar 20 of the shaft 16 includes a pair of relatively large circular washers 22 and a bolt 26 clamping a circular disc shutter 24 formed of a clear synthetic plastic material. The shutter 24 is of the construction shown in FIG. 2 wherein the central hub portion 28 thereof clamped by the washers 22 is usually opaque, and a plurality of radially extending opaque, light impervious portions 30 extend from the hub portion, separated by clear light transmitting portions 32. In the commercial embodiment there are 150 of each of portions 30 and 32, and it will be appreciated that the inventive concepts may be practiced with a greater or lesser number of shutter portions with appropriate variations in the time reference circuitry.

The rate of rotation of the shaft 16, and shutter 24 is sensed by means of an infrared light emitting diode mounted in holder 36 positioned adjacent one side of the periphery of the shutter, and upon the other side of the shutter 24 a photo transistor in holder 40 is mounted to detect the presence or absence of infrared light passing through the shutter periphery as controlled by the shutter portions 30 and 32. Accordingly, it will be appreciated that an electronic pulse will be produced in the photo transistor each time a clear portion 32 passes between the photo transistor and the infrared light emitting diode.

It is important that the shutter 24 be very accurately formed so that the width of the portions 30 and 32 be equal, and preferably, the shutter is formed by a reducing photographic process. Also, in order to minimize the likelihood of sunlight causing false signals produced in the photo transistor the photo transistor faces away from the cover 14. The aperature on the photo transistor is preferably 0.010 inches wide, and the accurate manufacture of the shutter 24 assures a highly accurate pulsating signal for the digital circuit. A block diagram illustrating the various components of the control circuit is shown in FIG. 3, and in the following description these various components will be described in greater detail. In FIG. 3 the various blocks of the circuit are identified by legend, and basically, the heart of the circuit consists of the digital counter 42 into which the pulsating signal from the photo transistor is fed, and into which a time reference signal is fed through control 44, time interval divider 46, time reference producing circuit 48, and all are supplied by power supply 50. Further, the digital counter 42 is connected to a digital display 52 of conventional type, and the first alarm set point circuit 54 is connected to the digital counter directly. The second alarm set point circuit 56 is connected to the digital counter through a comparator circuit 58 which is also connected to control 44, and the relay mechanism for the alarm signal circuit is generally indicated at 60. The shutter pulse signal is produced at 62 and passes through processor 64 before entering digital counter 47

The particular circuitry used in the various components of the control circuit is, for the most part, commercially available, and in the following description reference is made to such commercially available integrated circuits and switching structures as may be used by those skilled in the art in the practice of the invention. In the following description and drawings reference is more specifically made to the functional operation of the various components of the circuit and the circuit designer skilled in the art will appreciate the manner in which the circuit components may be interconnected to achieve the desired operation, interaction and function.

Figure 4:
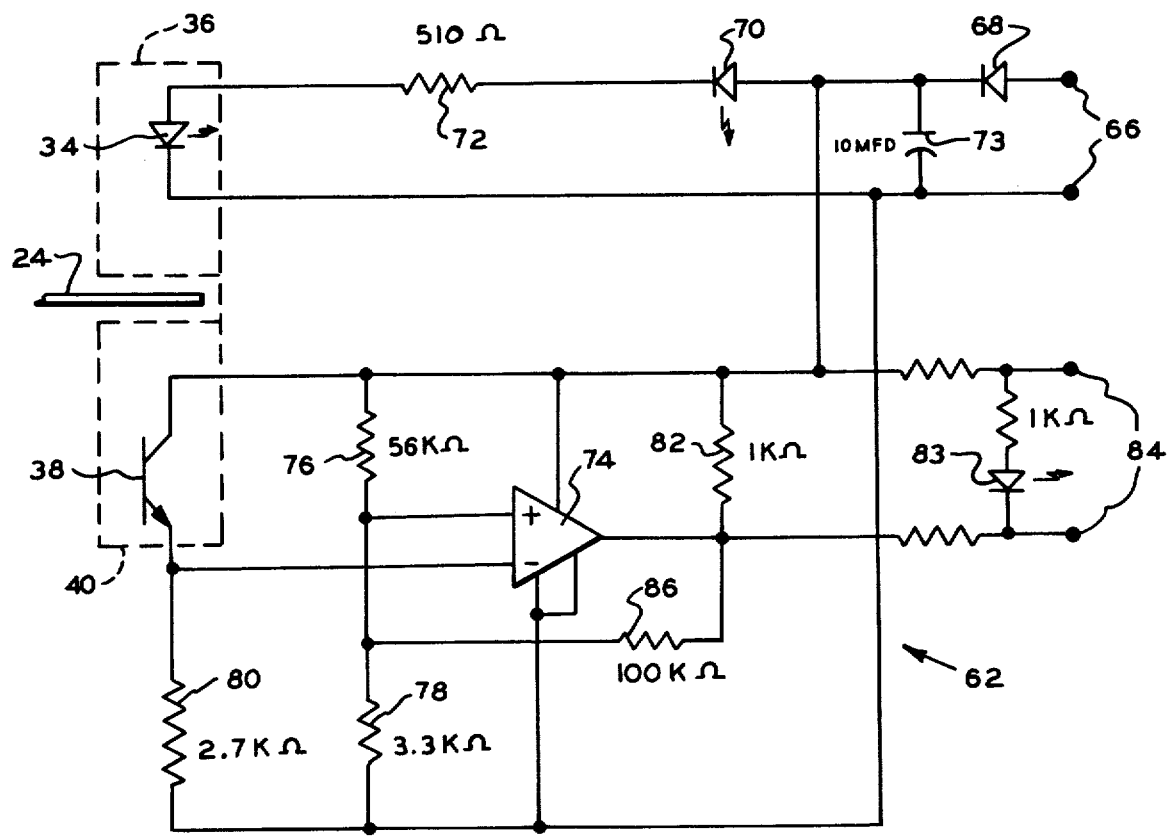
FIG. 4 is a partially schematic view of the light sensing ciruit.

The pulse circuit 62 directly associated with the shutter 24, light emitting diode 34 and the photo transistor 38 is shown in FIG. 4, and this circuit receives its power through terminals 66. Diode 68 prevents damage due to reverse polarity and LED 70 lights when current flows through the optical switch light emitting diode 34 which indicates that the LED 34 is functioning properly and that power is correctly applied. Resistor 72 limits the current to a safe value, while capacitor 73 filters any transients from the power supply lines. 74 is an integrated circuit voltage comparator Model LM311N available from Motorola Corporation and a reference level is established by the resistors 76 and 78. When the shutter 24 blocks the light source from the photo transistor 38, resistor 80 pulls the photo transistor emitter low, which causes the output of circuit 74 to increase, and resistor 82 imposes a constant load on 74. The output light emitting diode 83 is not extinguished. The purpose of LED 83 is to flash as the sensor shaft 16 is rotated thus indicating that the installer has a operating unit. If the installer accidentally shorts or miswires output terminals 84, the LED 83 will stop flashing. Resistors give the unit an output impedence of approximately 50 ohms and thus allows the twisted pair of transmission wires to have approximately equal impedence in addition to preventing temporary shorts from destroying the integrated circuit 74 driver output. With the output of circuit 74 high, near plus 12 volts, resistor 86 pulls the input reference set up by resistors 76 and 78 artifically high and sets up a schmidt trigger effect. As the disc 24 rotates to a clear region 32 permitting passage of light through the shutter, light striking the photo transistor 38 causes it to turn on and conduct and causes the emitter to approach the voltage on the collector, which is high. This causes the output to be low and lights the output LED 83. With the output low, feedback resistor 86 pulls the reference voltage artifically low and the light level must drop below the level at which the comparator switched to change back to its high state. This compensates for any inaccuracies on foreign matter on the edges of the shutter portions 30 or 32, or minor back and forth vibrations in the shaft, and assures that the system will not have undesirable high frequency oscillations.

At low revolutions, or pulse rates, the output of the photo transistor 38 appears as a sharp squarewave. However, at high pulse rates the capacitance exhibited at the photo transistor's base structure prevents instant turn on and the output resembles a sign wave of decreasing amplitude. However, the comparator will square the wave for transmission down a twisted pair of wires to the control box in which the remainder of the circuit components are located, and it is that desirable that this distance be as short as possible.

The power supply 50 would have a conventional input of 120 volts at 60 Hz, and includes an isolation transformer with dual secondary windings. The transformer includes rectifiers wherein the alternating current is rectified to direct current producing a plus 12 volts DC regardless of load demands. Preferably, the power supply would include conventional circuits to suppress inductive transients from relay coils, such as those used in the alarm circuit, and power indicating pilot lights may be included.

The time reference circuit 48 is shown in FIG. 5 and includes diodes 92 which convert the 60 Hz alternating current from the power transformer of the power supply 50 to 120 Hz of pulsating direct current. Capacitor 94 provides transients suppression, and the combination of resistors 96 reduce the direct current peaks to half their original voltage for the voltage comparator integrated circuit 98, manufactured by Motorola Inc. of Phoenix, Ariz. identified as MLM311P. The resistors 100 and 102 provide a reference level for the comparator 98 and with the feedback resistor 104 form a schmidt trigger with integrated circuit 98 to prevent false output excursions due to power line transients. The comparator 98 provides a clean squarewave for integrated circuit 106 manufactured by Motorola Inc. under the number designation MC14528 and this integrated circuit is timed by resistor 108 and capacitence 111 to trigger for approximately 80% of the peaks provided by the 60 Hz power line. The output 110 of the integrated circuit is an accurate 120 Hz cycles per second signal which is used as a time base for the counter circuits.

FIG. 6 schematically illustrates the divider circuit which receives the timing pulses at the rate of 120 per second from integrated circuit 106. Preferably, the desired reaction time of the circuit is either 0.4 seconds or 4 seconds for the particular shutter described above. The desired reaction time is produced by the series interconnection of integrated circuits 112, 114 and 116 supplied from the time reference, and these integrated circuits are identical and produced by Motorola Inc. as identified by numerical designation 4018A. Integrated circuit 112 will divide the input impulse train by 6, i.e. it provides a cycle change every sixth input cycle, integrated circuit 114 divides the output of 112 by eight, and at this point the output cycle changes every 48 pulses. Thus, the change at this point is 2.5 cycles per second, or 0.4 seconds per cycle. The integrated circuit 116 is connected to the output of 114, and divides the pulse received by 10, and by means of decimal switch 118 and integrated circuits 120A-D the reaction time of the circuit can be readily selectively adjusted between 0.4 seconds or 4 seconds. When switch 118 is closed plus 12 volts DC is provided through limit resistor 122 and causes a logic high to be presented to integrated circuit 120A and 120B thus enabling the 4 second cycle through integrated circuits 120B and 120C, and conductor 124. The integrated circuits 120A-D are identical and manufactured by ITT of New York City identified by number 4011. When the switch 118 is in the open position, no voltage is available to power LED 126 and a logic low is present at 120B blocking the 4 second pulses and causing 120D to be enabled high allowing the 0.4 second pulse train to pass through integrated circuits 120D and 120C and conductor 124. As the 4 second time is ten times as long as the 0.4 second reaction time, the circuit is capable of indicating an extra digit of resolution by use of the switch 118. Thus, a RPM reading of 40 will become 40.0 to provide better accuracy. A RPM of 40.5 cannot be displayed in two digits, and therefore a response of 4 seconds with the three digit resolution is required if this higher degree of accuracy is desired.

The sensor processing circuit 64 is not illustrated in detail as this circuit receives the signal from the photo transducer and basically consists of an opticoupler such as manufactured by Motorola Company known as integrated circuit 4N26. The use of this opticoupler circuit allows high voltage isolation between the sensor circuit and the rest of the circuitry as well as providing an unreferenced or floating input. This allows for common mode rejection of noise spikes in the sensor wires, such that a spike appearing on one wire will appear on both and therefore cause no potential across the opticoupler as neither lead is referenced to ground and both have an identical impedence.

The digital counter 42 basically consists of an integrated circuit manufactured by Mostek Company identified as the 50395N 5 digit counter. This commercially available counter receives pulses from the sensor processor 64 and counts them. Referring to FIG. 7, the pulse input 138 has an internal schmidt trigger to eliminate the the effects of transmission line problems. At the intervals of 0.4 or 4 seconds, the control section of the counter 42 generates a command to store the present count or RPM reading, which is multiplexed digit by digit to the display 52 through conductors D and to the switches of set point 54 by conductors E. This information will continue to be displayed and multiplexed until another value is stored. After this value is stored, the counter will reset to zero by means of a clear pulse from the control section of the counter.

The first set point circuit as represented at 54 consists of five binary coded decimal (BCD) strip switches 130A-E manufactured by Ecco Company of Santa Ana, Calif. identified as series 21 and these switches are connected to the digital counter 42 as schematically represented in FIG. 7. The counter loads the set point value of the switches into its register one digit at a time when the control section generates the load register command. The counter multiplexes digit by digit, digit 5, digit 4, digit 3, digit 2, digit 1, due to the set command generated by the counter control section. For example, if the value of the first set point was 98765, then the counter would multiplex in the data in binary coded decimal form through conductors F in the order 9 (digit 5), then 8 (digit 4), then 7 (digit 3), then 6 (digit 2) and then 5 (digit 1). The switches 130A-E are in series with diodes which act as insolation for the switches to allow them to be multiplexed during the storage time. All of the above functions occur in approximately 0.00007 seconds. The count input is operative and is counting input pulses. If the number in the counter 42 matches the number in the internal register which is the same value as that displayed by the switches 130A-E the counter will put out an equal pulse which is utilized by the control 44 to stop an alarm or underspeed condition from occurring at the next 0.4 second or 4 second time pulse. This represents a form of fail safe situation since if an equal pulse is not generated each cycle an alarm or warning condition will occur.

In the disclosed embodiment, the shutter 24 has 150 portions 30 and 32. Therefore, if the shaft 16 is turning 100 RPM, 150 marks per revolution will cause 15,000 pulses per minute. In a period of 0.4 seconds there will be 100 pulses; therefore the counter 42 will count 100 pulses and the number 100 will be displayed. In four seconds there are 1000 pulses, therefore the counter will count and store 1000 pulses and the number 1000 will be displayed, however, the decimal point lights when the four second decimal switch 118 is selected so the viewer will see 100.0 displayed.

It will therefore be understood that the number of light transmitting portions 32 on the shutter relates directly to the response time to make the display read correctly in revolutions per minute or other units of measure. Counting pulses gives greater accuracy than timing the width of a portion 30 or 32, or other event, since the circuit can ignore the effects of the transmission lines on the leading and trailing edges of the sensor pulses.

The digital display 52 is of a conventional LED display type, and the digital counter 42 sequentially multiplexes the stored values for each of the displayed digits starting with digit 5. The digital display is conventionally connected to the digital counter, and a detailed description of its construction and relationship to the output of the digital counter is not necessary as such would be known to one skilled in the art.

The comparator 58, FIG. 8, is of a four bit type utilizing the integrated circuit 132 manufactured by Fairchild Semiconductor of Mountain View, Calif., Model 40085 used in conjunction with five binary coded decimal digital switches 134A-E similar to switches 130 described above as manufactured by Ecco Company. The digital switches 134A-E provide the second alarm set point circuit 56 and the second set point value is preset on the five switches 134A-E which include diodes to provide switch isolation to allow multiplexing. The comparator 58 is connected to the digital counter 42 and the counter provides a binary coded decimal output of the stored or displayed value, multiplexed digit by digit most significant digit to least significant digit. Immediately after a new value is stored, the set and load register pulses cause the counter to output the binary coded decimal values sequentially and to multiplex the corresponding digit in the switches 134A-E into the comparator 58. Integrated circuits 136, manufactured by Motorola Inc., Model 4081 forms a gate which allows the counter value to be inputed to the comparator only during the time the switch data 134A-E is inputed. The function of the comparator 58 is to compare each digit of the two set point numbers and determine whether they are equal to, less than or greater than the other and provide this data to the control circuit 44. The counter number is analyzed from most significant digit MSD to least significant digit LSD to determine if it is greater than or less than the second set point value as set on switches 134A-E. Mathematically, number A is greater than number B if a larger number is encountered first, in number A when inspected sequentially most significant digit to least significant digit. If a high order digit is greater than the set point value, then control 44 is signaled through conductor 138 and the alarm is disabled. If a higher order digit in sequence is less than the set point value then control 44 is signaled through conductor 140 and the alarm is enabled. For example, if the display 52 reads 04321 and set point switches 134A-E read 03421, then with digit 5 (MSD) active neither less than nor greater than would be active because both values are equal. With digit 4 active, the display value 4 is greater than the set point value 3, so a logic 1 (high) "greater-than," pulse would clock the control 44 value. When digit 3 is active the displayed value 3 is less than the set point value 4, so a high is generated at circuit 132 which clocks the control 44. However, this produces no change since the control 44 has already been clocked putting a low or no change signal into its circuitry. Comparing further digits also gives no change as only the highest order non-equal digit is of consequence. Therefore the alarm circuit for the second set point will be energized.

A schematic representation of the control circuit 44 is shown in FIG. 9, and this control section generates the signals to control the counter 42 in relation to the time base i.e. 0.4 or 4 seconds. Integrated circuit 142 manufactured by Motorola Company identified as No. 4098, provides approximately a 5 microsecond pulse upon positive transition of the time base i.e. each cycle. This provides the store command for the counter section through NOR gate integrated circuit 144, Motorola Model 4001, and provides the first alarm signal. Integrated circuit 142 is triggered for 4 microseconds after timing out and this circuit provides the clear command through integrated circuits 146 (identical to 144) for the digital counter, and a new cycle reset for integrated circuit 148 manufactured by Motorola Company identified as No. 4013 and the equal pulse storage flip-flop located in the comparator circuit 58. It also resets the load register latch of integrated circuit 150 manufactured by Motorola Company reference No. 4013, and resets the comparator to permit a comparison of cycles. The "one shot" sections of integrated circuit 142 cause the following events to occur; store current count in the display latches of the integrated circuit of counter 42, clock the alarm information learned during the last count cycle into alarm latch circuit 152, Motorola Model 4013, clear the counter 42 back to zero for start of next cycle, reset the alarm latch circuit 148 to capture the alarm data during the next cycle, reset the comparator latches for the next compare cycle, set via set signal the counter 42 to digit 6 so that when the scan starts it will output most significant digit to least significant digit, starting with digit 5, output load register signal via setting of integrated circuit 150, counter starts to scan most significant digit to least significant digit while comparator 58 operates for alarm signal and the second set point information is loaded into the internal register, counter 42 outputs high which terminates the low register signal and circuit 150. Counter 42 counts input pulses until the time base generates a new cycle.

When the power to the system is turned on integrated circuit 106, FIG. 5, generates a master reset which serves to initiate the divider circuits 112, 114 and 116, and master counter 42, the alarm circuits and the other control components.

From the aforegoing description it will be appreciated that the electronic pulses being generated by the phototransistor 38 will be counted by the digital counter 42, and these pulses will be time referenced and displayed, and compared with both the setting of the switches 130A-E of the first set point circuit 54 and switches 134A-E of the second set point circuit 56 during the comparison intervals of 0.4 seconds or 4 seconds depending on the setting of decimal switch 118. Upon the circuit sensing a deviation of counts below that in set point circuit 54 or set point circuit 56 the alarm signals will be generated which will close relays in the alarm circuitry 60 to energize warning lights, energize audible signals, or control motor control apparatus to automatically shut down the equipment whose operation is being monitored by shaft 16.

By counting pulses with respect to a time signal a direct read out is obtainable and a very high accuracy and sensitivity can be maintained. The use of two set point circuits provides a versaility of control not possible with known sensors.

While the circuit has been described as a rotation rate sensor it is to be appreciated that the concepts can be utilized to monitor other input values, for instance, voltages or amperage could be monitored by using a pulse producing transducer sensitive to voltages on or amperage and such pulses counted with reference to time can be used in conjunction with set point circuits to produce alarms or control functions.

It is appreciated that various modifications to the inventive concept may be apparent to those skilled in the art without departing from the spirit of the invention.

I claim:

1. A digital controlled rotation sensor for sensing the reduction of the rate of rotation of a member comprising, in combination, a sensor rotatably driven by the member to be sensed, said sensor producing an electronic signal pulsating at a rate directly proportioned to the rate of rotation of the member to be sensed and comprising a rotatable shaft drivenly connected to the member to be sensed, a circular disc mounted on said shaft for rotation therewith, alternately positioned light transparent and opaque portions defined on said disc, an infrared light source located adjacent one side of said disc and infrared light sensing means disposed adjacent the other side of said disc for sensing the rate of alternation of said light transparent and opaque portions past said light source producing said electronic signal, a digital counter receiving said electronic signal and counting the pulsations thereof, time reference signal producing means introducing a time reference signal into said digital counter, a first adjustable set point comparator connected to said digital counter capable of being pre-set to sense a predetermined pulse count and sensing the pulse count of said digital counter, alarm indicating means connected to said digital counter and set point comparator and producing an alarm control signal upon said set point comparator's sensing a predetermined reduction in the number of pulses being counted by said digital counter and the setting of said comparator, a second adjustable set point comparator connected to said digital counter capable of being pre-set to sense a predetermined pulse count and sensing the pulse count of said digital counter, said second set point comparator being connected to said alarm indicating means producing a second alarm control signal upon said second set point comparator sensing a predetermined reduction in the number of pulses being counted by said digital counter and the setting of said second set point comparator which is a greater reduction than the reduction in the number of pulses compared by said first set point comparator.

2. In a digital controlled rotation sensor as in claim 1 wherein said time reference signal producing means includes time signal dividing means, said dividing means including a first portion and a second portion, said first portion having a time reference signal of ten times the duration of said second portion, and a decimal switch selectively connecting said first or second portion to said digital counter.

* * * * *